US012561137B2

(12) United States Patent
Levy et al.

(10) Patent No.: US 12,561,137 B2
(45) Date of Patent: Feb. 24, 2026

(54) SOFTWARE-HARDWARE INTERFACE PROTECTION

(71) Applicant: MELLANOX TECHNOLOGIES, LTD., Yokneam (IL)

(72) Inventors: Moni Levy, Petach Tikva (IL); Sagi Rotem, Adi (IL)

(73) Assignee: Mellanox Technologies, Ltd, Yokneam (IL)

( * ) Notice: Subject to any disclaimer, the term of this patent is extended or adjusted under 35 U.S.C. 154(b) by 658 days.

(21) Appl. No.: 18/080,761

(22) Filed: Dec. 14, 2022

(65) Prior Publication Data

US 2024/0201989 A1 Jun. 20, 2024

(51) Int. Cl.
*G06F 9/30* (2018.01)
*G06F 9/54* (2006.01)

(52) U.S. Cl.
CPC .......... *G06F 9/30036* (2013.01); *G06F 9/546* (2013.01)

(58) Field of Classification Search
CPC .............................. G06F 9/30036; G06F 9/546
See application file for complete search history.

(56) References Cited

U.S. PATENT DOCUMENTS

| | | | | |
|---|---|---|---|---|
| 11,275,567 B1* | 3/2022 | Chiluvuri | .............. | G06F 9/5072 |
| 11,556,382 B1* | 1/2023 | Byagowi | .............. | G06F 9/4881 |

| | | | | |
|---|---|---|---|---|
| 2004/0088150 A1* | 5/2004 | Gay | ......................... | G06F 30/33 |
| | | | | 714/E11.219 |
| 2004/0128627 A1* | 7/2004 | Zayas | ..................... | G06F 30/30 |
| | | | | 716/100 |
| 2004/0131079 A1* | 7/2004 | Hegde | ................... | H04L 69/161 |
| | | | | 370/466 |
| 2006/0130048 A1* | 6/2006 | Ho | ............................ | G06F 8/38 |
| | | | | 717/170 |
| 2008/0092113 A1* | 4/2008 | Weinstein | ............... | G06F 8/433 |
| | | | | 717/106 |
| 2010/0268888 A1* | 10/2010 | Gheith | .................. | G06F 9/3888 |
| | | | | 711/E12.017 |
| 2016/0294693 A1* | 10/2016 | Cheng | ..................... | H04L 45/60 |
| 2016/0321159 A1* | 11/2016 | Romm | .................. | G06F 11/364 |
| 2017/0102955 A1* | 4/2017 | Hussey | ..................... | G06F 8/33 |
| 2019/0042404 A1* | 2/2019 | Subramanian | ...... | G06F 12/0246 |
| 2019/0384348 A1* | 12/2019 | Srinivasan | .......... | G06F 9/30101 |

* cited by examiner

*Primary Examiner* — Nha T Nguyen
(74) *Attorney, Agent, or Firm* — Meitar Patents Ltd.; Daniel Kligler

(57) ABSTRACT

In one embodiment, a software and hardware development method include providing a software-hardware interface to provide a data interface between hardware of an application specific integrated circuit (ASIC) and software running on a processor, providing control of a given part of the software-hardware interface to a software feature thereby yielding a more stable software-hardware interface, receiving a request to change the controlled given part of the software-hardware interface, and providing a message responsively to the request to change the controlled given part of the software-hardware interface.

25 Claims, 7 Drawing Sheets

10

SOFTWARE-HARDWARE INTERFACE PROTECTION

FIELD OF THE INVENTION

The present invention relates to processing systems, and in particular, but not exclusively to, a software-hardware interface.

BACKGROUND

An application-specific integrated-circuit (ASIC) may include one or more microprocessors executing software plus a complicated logic pipeline. In some case the microprocessors may be external to the ASIC and connected to the ASIC via a suitable data bus. The software is generally used to configure and run the ASIC.

As part of ASIC development, the hardware is designed, and the software is developed. The software is partially developed before the ASIC is produced. The ASIC hardware development code (e.g., register-transfer level (RTL)) is frozen so that the ASIC may be sent for production during which time no changes are allowed to the ASIC hardware development code. The next stage involves receiving the produced ASICs for integration. Between these stages could be 3-5 months in which software code can be changed and further enhanced to support additional ASIC functionality. As part of the integration stage, software is integrated with the ASIC hardware just received.

SUMMARY

There is provided in accordance with an embodiment of the present disclosure, a software and hardware development method, including providing a software-hardware interface to provide a data interface between hardware of an application specific integrated circuit (ASIC) and software running on a processor, providing control of a given part of the software-hardware interface to a software feature thereby yielding a more stable software-hardware interface, receiving a request to change the controlled given part of the software-hardware interface, and providing a message responsively to the request to change the controlled given part of the software-hardware interface.

Further in accordance with an embodiment of the present disclosure the providing control includes assigning a feature label of the software feature to the given part of the software-hardware interface.

Still further in accordance with an embodiment of the present disclosure, the method includes receiving user input selecting the feature label from a feature label database.

Additionally in accordance with an embodiment of the present disclosure, the method includes adding the feature label to a feature label database.

Moreover, in accordance with an embodiment of the present disclosure the given part is a given control register in a control register space of the software-hardware interface.

Further in accordance with an embodiment of the present disclosure the providing control includes assigning a feature label of the software feature to the given control register.

Still further in accordance with an embodiment of the present disclosure, the method includes changing a non-software-controlled part of the software-hardware interface.

Additionally in accordance with an embodiment of the present disclosure the providing the message includes providing the message indicating that the request to change the software-hardware interface is denied.

Moreover, in accordance with an embodiment of the present disclosure the message includes a warning message warning that the request is attempting to change the controlled given part of the software-hardware interface.

Further in accordance with an embodiment of the present disclosure, the method includes providing an option to change the software-hardware interface despite the warning message, and changing the controlled given part of the software-hardware interface.

Still further in accordance with an embodiment of the present disclosure, the method includes providing a message to a software developer of the software feature that the controlled given part of the software-hardware interface has been, or will be, changed.

Additionally in accordance with an embodiment of the present disclosure, the method includes requesting from a hardware developer a reason for the change to the controlled given part of the software-hardware interface.

Moreover, in accordance with an embodiment of the present disclosure, the method includes requesting permission from a software developer to change the controlled given part of the software-hardware interface.

There is also provided in accordance with another embodiment of the present disclosure, a computer system, including a processor to provide a software-hardware interface to provide a data interface between hardware of an application specific integrated circuit (ASIC) and software running on a processor, provide control of a given part of the software-hardware interface to a software feature update thereby yielding a more stable software-hardware interface, receiving a request to change the controlled given part of the software-hardware interface, and provide a message responsively to the request to change the controlled given part of the software-hardware interface, and a memory to store the software-hardware interface.

Further in accordance with an embodiment of the present disclosure the processor is configured to assign a feature label of the software feature to the given part of the software-hardware interface.

Still further in accordance with an embodiment of the present disclosure the processor is configured to receive user input selecting the feature label from a feature label database.

Additionally in accordance with an embodiment of the present disclosure the processor is configured to add the feature label to a feature label database.

Moreover, in accordance with an embodiment of the present disclosure the given part is a given control register in a control register space of the software-hardware interface.

Further in accordance with an embodiment of the present disclosure the processor is configured to assign a feature label of the software feature to the given control register.

Still further in accordance with an embodiment of the present disclosure the processor is configured to change a non-software-controlled part of the software-hardware interface.

Additionally in accordance with an embodiment of the present disclosure the processor is configured to provide the message indicating that the request to change the software-hardware interface is denied.

Moreover, in accordance with an embodiment of the present disclosure the message includes a warning message warning that the request is attempting to change the controlled given part of the software-hardware interface.

Further in accordance with an embodiment of the present disclosure the processor is configured to provide an option to change the software-hardware interface despite the warning message, and change the controlled given part of the software-hardware interface.

Still further in accordance with an embodiment of the present disclosure the processor is configured to provide a message to a software developer of the software feature that the controlled given part of the software-hardware interface has been, or will be, changed.

Additionally in accordance with an embodiment of the present disclosure the processor is configured to request from a hardware developer a reason for the change to the controlled given part of the software-hardware interface.

Moreover, in accordance with an embodiment of the present disclosure the processor is configured to request permission from a software developer to change the controlled given part of the software-hardware interface.

There is also provided in accordance with still another embodiment of the present disclosure, a software product, including a non-transient computer-readable medium in which program instructions are stored, which instructions, when read by a central processing unit (CPU), cause the CPU to provide a software-hardware interface to provide a data interface between hardware of an application specific integrated circuit (ASIC) and software running on a processor, provide control of a given part of the software-hardware interface to a software feature thereby yielding a more stable software-hardware interface, receive a request to change the controlled given part of the software-hardware interface, and provide a message responsively to the request to change the controlled given part of the software-hardware interface.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
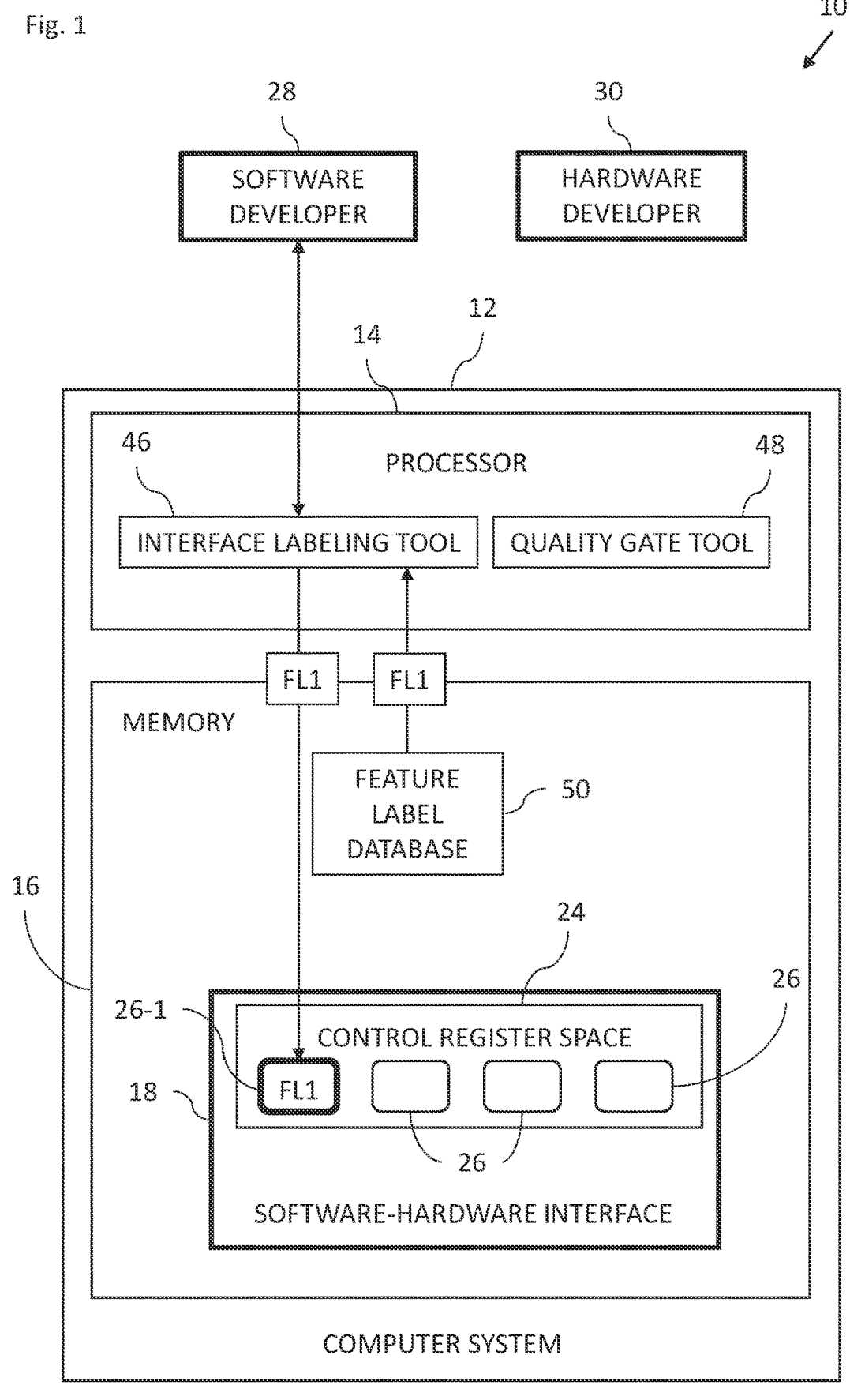
FIG. 1 is a block diagram view of a software and hardware development system constructed and operative in accordance with an embodiment of the present invention.

As previously mentioned, as part of ASIC development, the hardware is designed, and the software is developed. The software is partially developed before the ASIC is produced. The ASIC hardware development code is frozen so that the ASIC may be sent for production during which time no changes are allowed to the ASIC hardware development code. The next stage involves receiving the produced ASICs for integration. Between these stages could be 3-5 months in which software code can be changed and further enhanced to support additional ASIC functionality. As part of the integration stage, software is integrated with the ASIC hardware just received.

One option is to receive the produced ASIC and then start developing the software, and then perform integration and verification. This would lead to a very long ASIC development time. One solution to save development time is to start developing the software before the produced ASIC is available. The software may then be developed and tested using software simulation or hardware simulation of the ASIC.

Another challenge in ASIC development is the software-hardware interface between hardware of the ASIC and the software running on a processor of the ASIC. The software-hardware interface may be thought of as a contract between software developers and hardware developers and both agree on the interface. Before starting development of software and hardware, the interface is agreed upon and does not change. However, this is inflexible as this provides no flexibility during ASIC development for hardware changes which may result in larger, slower and less power efficient hardware. However, allowing hardware changes to occur irrespective of their effect on the agreed interface will result in many changes to software (design and possibly code) which relies on the agreed interface.

Therefore, embodiments of the present invention address some of the above drawbacks by providing a software and hardware development system in which changes to the agreed upon software-hardware interface are allowed to be made by the hardware developers (or architects) as long as the changes are not to parts of the interface already claimed by software developers (or architects). The term developer and architect may be used interchangeably throughout the claims and specification. The parts of the interface already claimed by software developers may be referred to as software-controlled parts of the interface. As the interface is claimed or controlled by various software features, modules, and changes, the interface is said to become more stable in that the controlled parts of the interface cannot be changed or can be changed in a controlled way as described below. Therefore, at any point during the development, some parts are controlled by the software and are generally locked to changes while other non-controlled parts of the interface are unlocked for changes by the hardware developers. This allows more flexibility for the hardware developers leading to a smaller, faster, and more power efficient ASIC while reducing the overhead of adapting the software that has already been designed and possibly already been developed. The process leads to more efficient software development and reduces the number of software iterations and the need to redesign and recode already existing software designs and code.

In some embodiments, the parts of the interface which are controlled by the software are labeled (upon request of a software developer) with the respective software features that use the parts of the interface. For example, if part 1 of the interface is used by software features A and B, part 1 is labeled A and B, and so on. The use of labeling may also help hardware architects and developers to see how their hardware design is mapped with logical features of the ASIC and the ASIC software.

In some embodiments, if a hardware developer requests to change a controlled part of the interface, the hardware developer receives a message indicating the proposed request has been denied. In some embodiments, the hardware developer is able to override a software-controlled part of the interface and change the software-controlled part of the interface. In such cases, the software developer affected by the override may be informed of the override in order to affect appropriate changes to already designed and possibly developed software.

In some embodiments, the hardware developer is able to send a request (including reasons for the proposed change to the interface) to the software developer whose software uses the controlled part of the interface that the hardware developer wants to change for permission to make the change to the interface.

System Description

Reference is now made to FIG. 1, which is a block diagram view of a software and hardware development system 10 constructed and operative in accordance with an embodiment of the present invention.

The system 10 includes a computer system 12 including a processor 14 and a memory 16. The processor 14 is configured to run software to manage software and hardware development of an ASIC (not shown). The memory 16 is configured to store a software-hardware interface 18, and a feature label database 20. The software-hardware interface 18 describes a data interface between ASIC hardware and a processor of the ASIC (or a processor connected to the ASIC via a suitable data bus, for example) which runs software. The software-hardware interface 18 may include a control register space 24 including a plurality of control registers 26. One or more software developers (or architects) 28 (only one shown for the sake of simplicity) may claim control of parts of the software-hardware interface 18 (based on software features using parts of the software-hardware interface 18) via an interface labeling tool 46 running on the processor 14, as described in more detail with reference to FIGS. 2 and 7. One or more hardware developers (or architects) 30 (only one shown for the sake of simplicity) may request to change parts of the software-hardware interface 18 (based on changes to the ASIC hardware) via a quality gate tool 48 running on the processor 14, as described in more detail with reference to FIGS. 3-7.

FIG. 1 shows the software developer 28 selecting a feature label "FL1" from a feature label database 50 (stored in the memory 16) and adding the selected feature label to the software-hardware interface 18 using the interface labeling tool 46 based on the software developer 28 making a software update (e.g., addition or change to software architecture or code) via the computer system 12. The software update uses one of the control registers 26, namely control register 26-1. The feature label "FL1" is added to control register 26-1 to indicate that the software architecture now has control over control register 26-1 and is related to "feature 1" of the software architecture. For example, a software architect may add a software feature, or amend a software feature etc., and adds one or more feature labels to the software-hardware interface 18. A software developer may be writing code which uses the software-hardware interface 18 and adds the one or more feature labels to the software-hardware interface 18 corresponding the code use of the software-hardware interface 18.

In practice, some or all of the functions of the processor 14 may be combined in a single physical component or, alternatively, implemented using multiple physical components. These physical components may comprise hard-wired or programmable devices, or a combination of the two. In some embodiments, at least some of the functions of the processor 14 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 2:
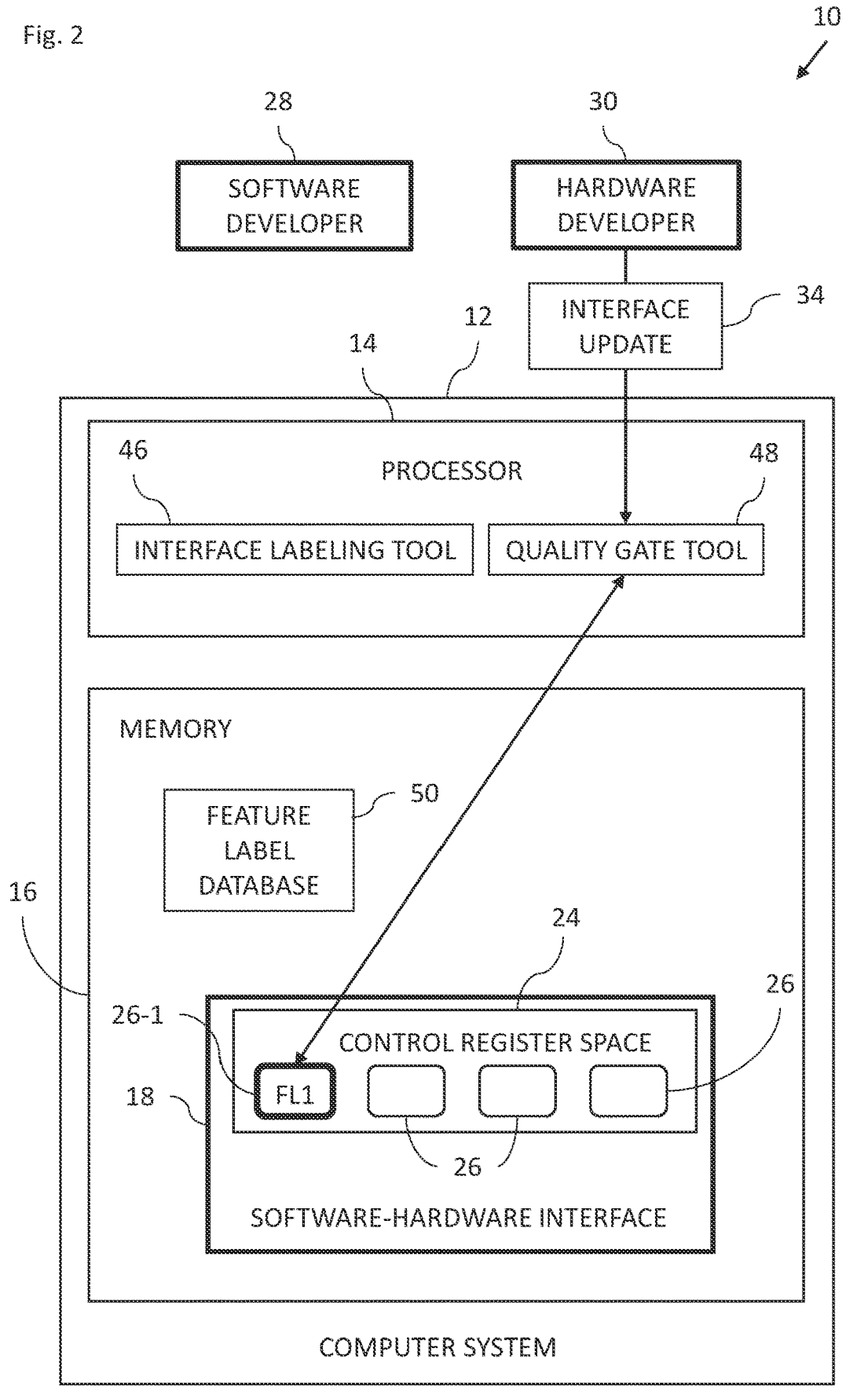
FIG. 2 is a block diagram view of the system of FIG. 1 showing an attempted interface update.

Reference is now made to FIG. 2, which is a block diagram view of the system 10 of FIG. 1 showing the hardware developer(s) 30 requesting an interface update 34 (due to a design change in ASIC hardware) to the software-hardware interface 18 via the quality gate tool 48. FIG. 2 shows the hardware developer(s) 30 requesting to perform the interface update 34 via the quality gate tool 48 running on the processor 14 of the computer system 12. The interface update 34 is designed to change the control register 26-1 which is controlled by the software architecture. However, the interface update 34 needs to update the software-hardware interface 18 and in particular the control register 26-1 which is controlled by the software architecture in a way which was not agreed upon initially when the software-hardware interface 18 was defined by the software developer(s) 28 and the hardware developer(s) 30.

Figure 3:
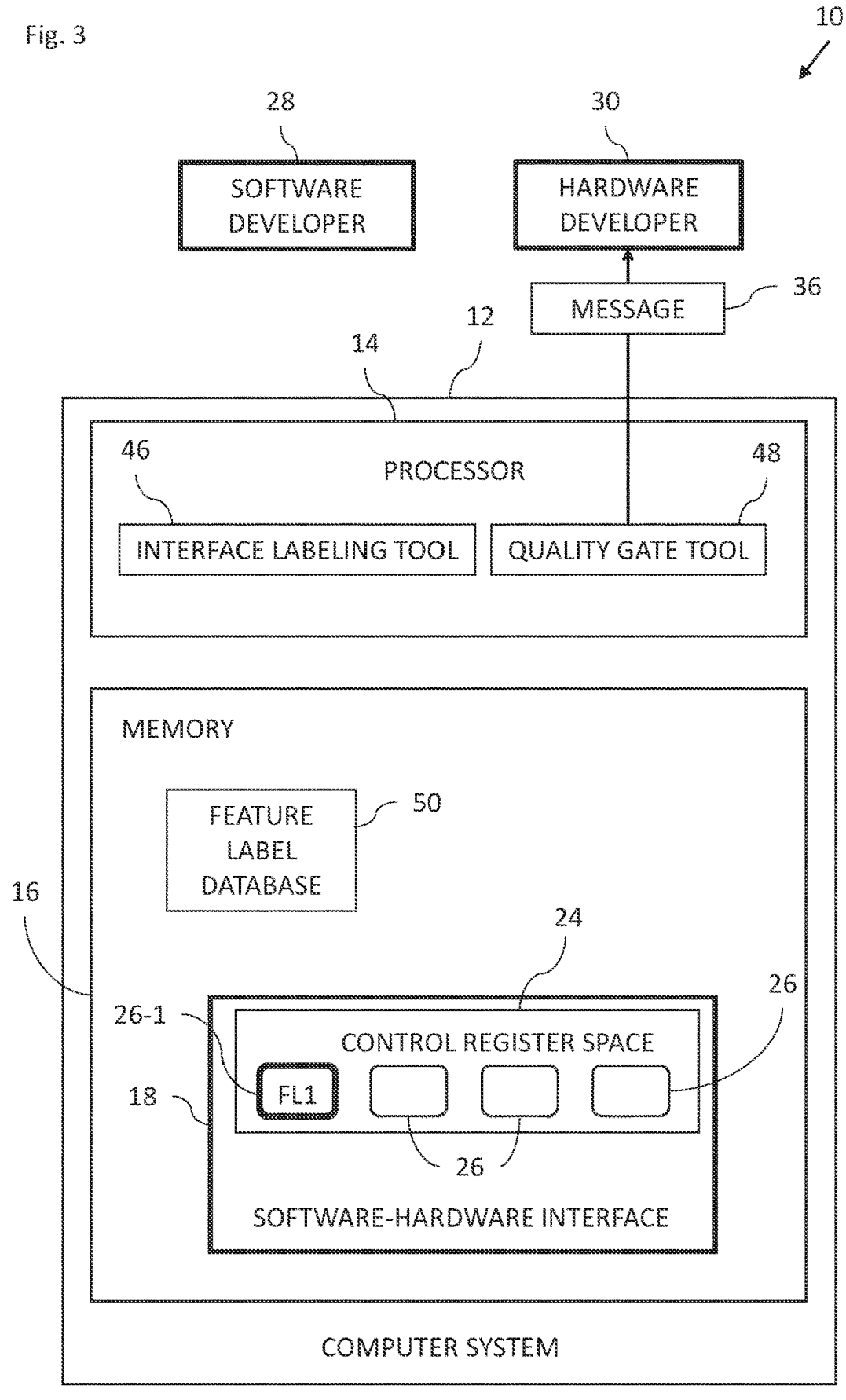
FIG. 3 is a block diagram view of the system of FIG. 1 showing a message being provided to a hardware developer.

Reference is now made to FIG. 3, which is a block diagram view of the system 10 of FIG. 1 showing a message 36 being provided to the hardware developer 30 by the quality gate tool 48. The message may warn the hardware developer 30 that the proposed interface update 34 requires updating a software-controlled part of the software-hardware interface 18.

Figure 4:
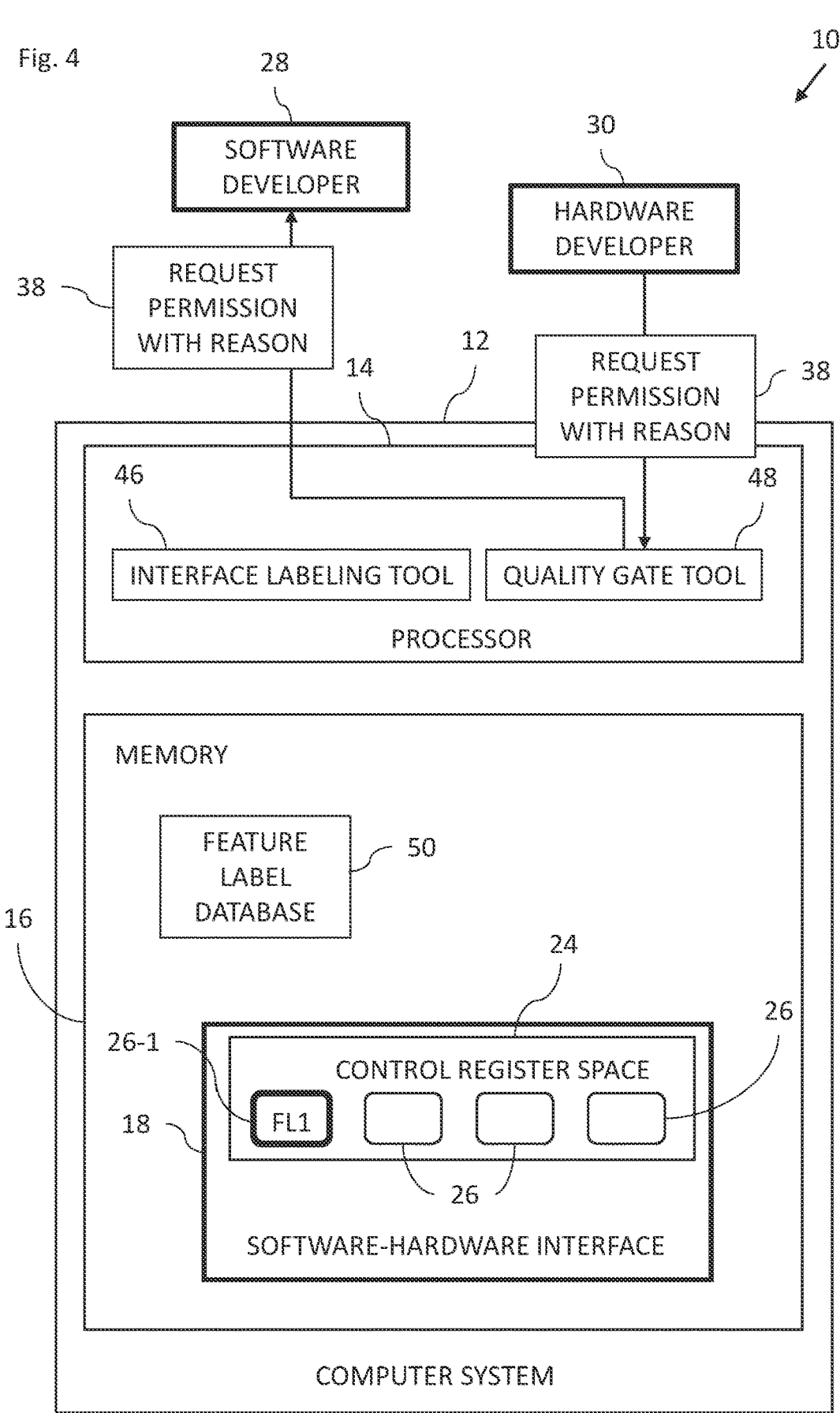
FIG. 4 is a block diagram view of the system of FIG. 1 showing the hardware developer requesting permission from the relevant software developer to update a software-hardware interface.

Reference is now made to FIG. 4, which is a block diagram view of the system 10 of FIG. 1 showing the hardware developer 30 requesting permission from the relevant software developer 28 via the quality gate tool 48 to update the software-hardware interface 18. In some embodiments, in response to receiving the message 36, the hardware developer(s) 30 sends a request 38 to the software developer(s) 28 via the quality gate tool 48 running on the processor 14 of the computer system 12 requesting permission to change the software-controlled part (e.g., the control register 26-1) of the software-hardware interface 18. The request 38 may also include a reason provided by the hardware developer(s) 30 why the update to the software-hardware interface 18 is so important. Assuming the software developer 28 provides the permission, the quality gate tool 48 may update the software-hardware interface 18 with respect to the interface update 34.

Figure 5:
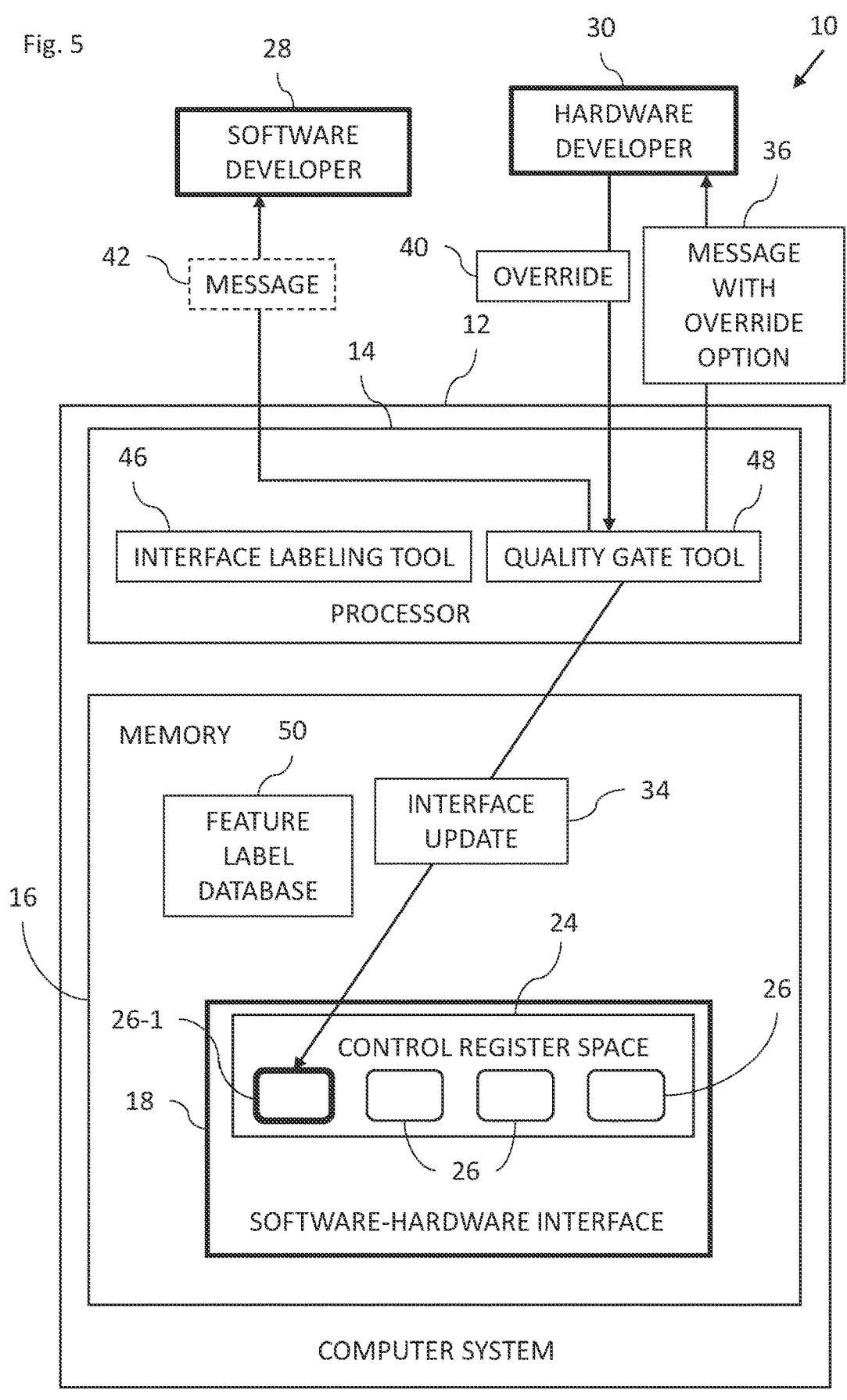
FIG. 5 is a block diagram view of the system of FIG. 1 showing the hardware developer overriding a software-controlled part of the software-hardware interface.

Reference is now made to FIG. 5, which is a block diagram view of the system 10 of FIG. 1 showing the hardware developer 30 overriding a software-controlled part of the software-hardware interface 18. In some embodiments, the message 36 may include an override option as shown in FIG. 5. The hardware developer(s) 30 may activate an override command 40 causing the quality gate tool 48 to override the software-controlled part of the software-hardware interface 18 and update the software-hardware interface 18. The computer system 12 may send a message 42 to the software developer 28 informing the software developer 28 of the override performed by the quality gate tool 48 running on the processor 14 of the computer system 12 thereby changing the software-hardware interface 18 and affecting at least part of the software architecture. In some embodiments, the message may be in the form of a report including one or more changes made to the software-hardware interface 18 by the hardware developer(s) 30 and optionally reasons for those changes.

7

Figure 6:
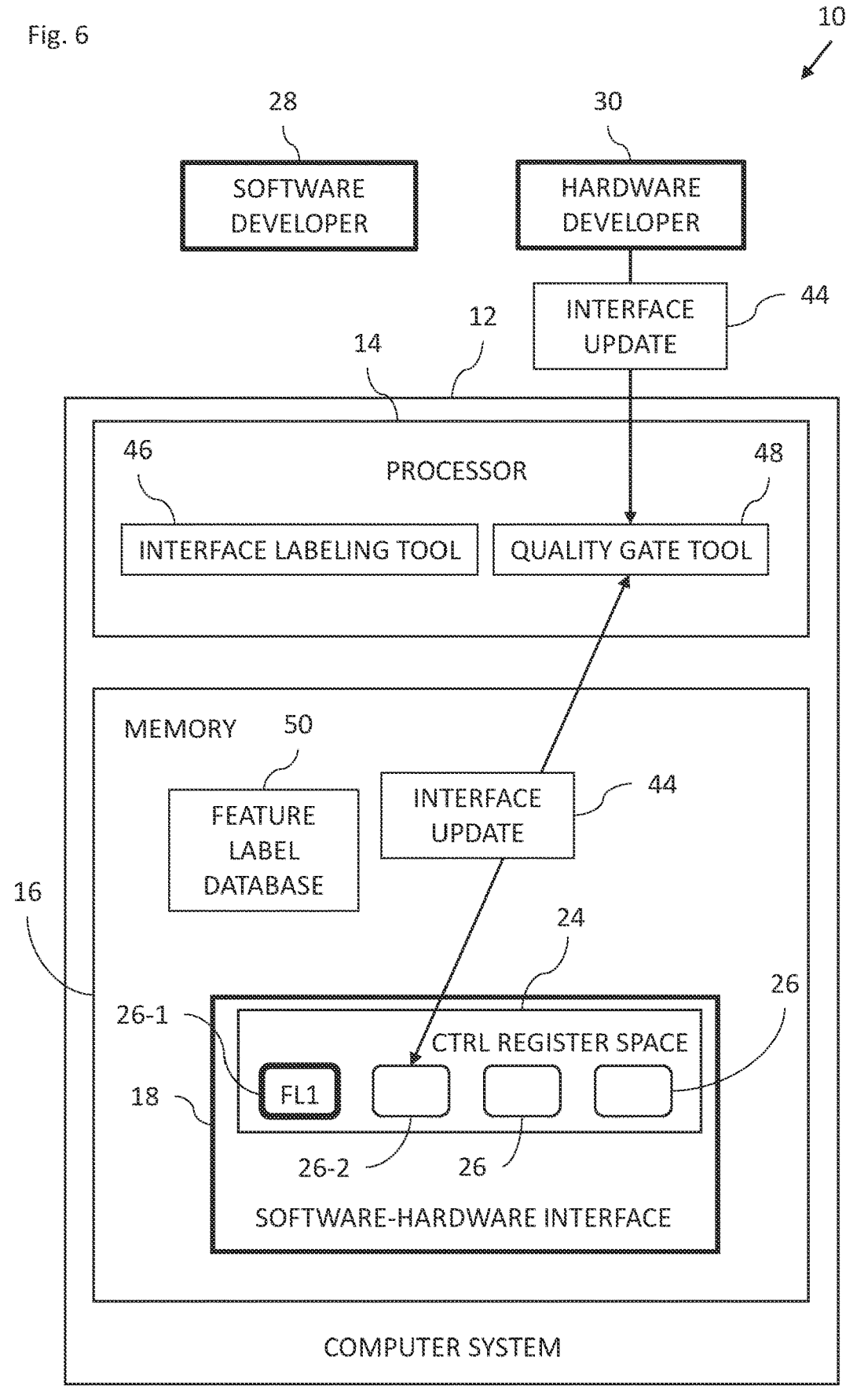
FIG. 6 is a block diagram view of the system of FIG. 1 showing changing a non-software-controlled part of the software-hardware interface.

Reference is now made to FIG. 6, which is a block diagram view of the system 10 of FIG. 1 showing the hardware developer(s) 30 requesting an interface update 44 (due to a design change in ASIC hardware) via the quality gate tool 48 to change a non-software-controlled part 26-2 of the software-hardware interface 18. As the interface update 44 does not need to change a software-controlled part of the software-hardware interface 18, the interface update 44 request is approved by the quality gate tool 48 and the part 26-2 of the software-hardware interface 18 is updated by the quality gate tool 48.

Figure 7:
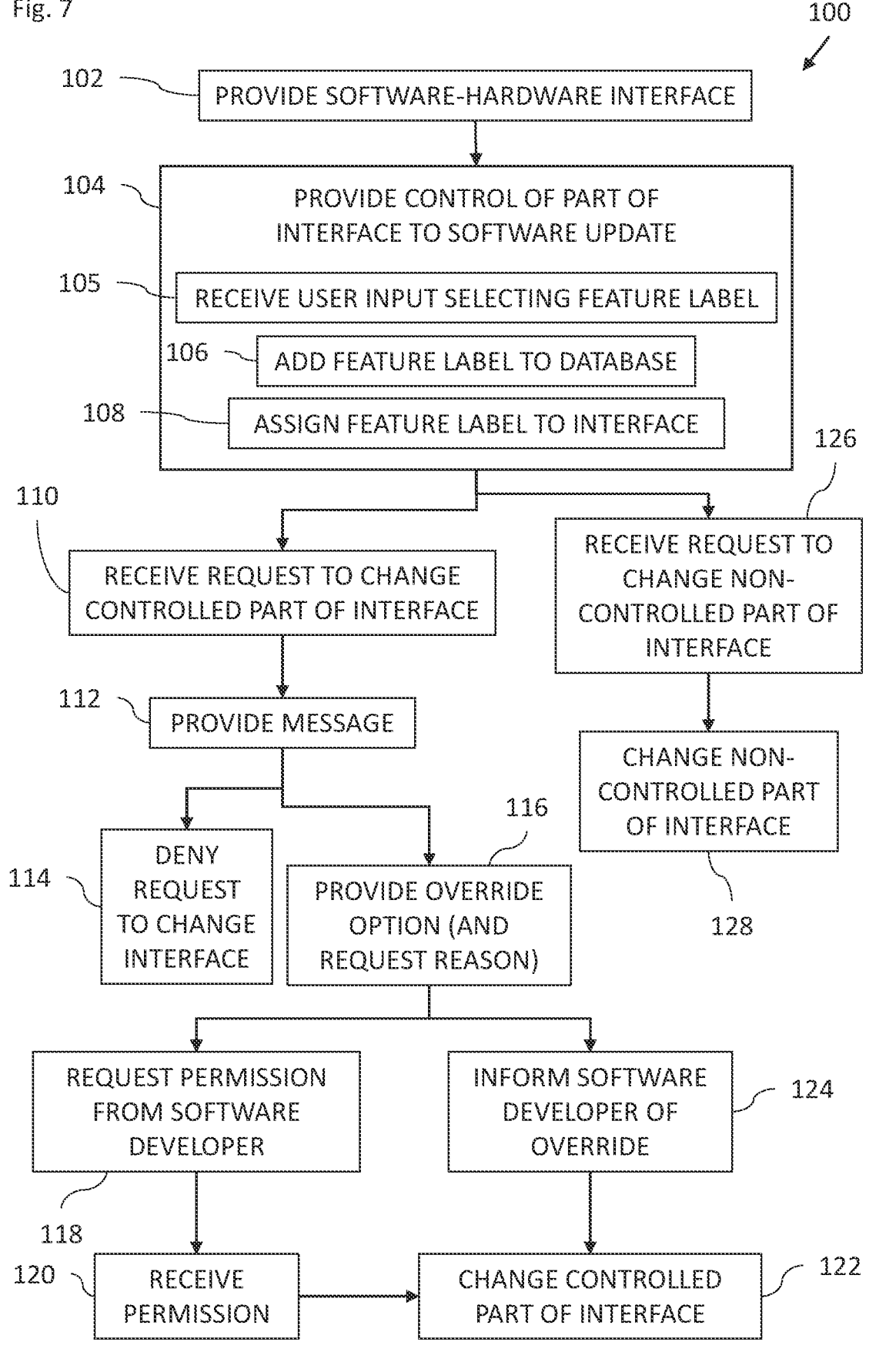
FIG. 7 is a flowchart including steps in a method of operation of the system of FIG. 1.

Reference is now made to FIG. 7, which is a flowchart 100 including steps in a method of operation of the system 10 of FIG. 1. The processor 14 is configured to provide the software-hardware interface 18 to provide a data interface between hardware of an application specific integrated circuit (ASIC) and software running on a processor of the ASIC (block 102). The processor 14 is configured to provide control of a given part 26-1 of the software-hardware interface 18 to a software feature (or more than one software feature) thereby yielding a more stable software-hardware interface 18 (block 104). The step of block 104 may include the interface labeling tool 46 running on the processor 14 being configured to receive user input selecting a feature label (or feature labels) from the feature label database 50 (block 105) and/or add a new feature label(s) to the feature label database 50 (block 106). The interface labeling tool 46 running on the processor 14 is configured to assign the selected (or new) feature label(s) of the software feature(s) to the given part 26-1 of the software-hardware interface 18 (block 108). In some embodiments, the given part of the software-hardware interface 18 is the given control register 26-1 in the control register space 24 of the software-hardware interface 18, and the interface labeling tool 46 running on the processor 14 is configured to assign the feature label(s) of the software feature(s) to the given control register 26-1.

The quality gate tool 48 running on the processor 14 is configured to receive a request (from the hardware developer(s) 30) to change the controlled given part 26-1 of the software-hardware interface 18 (block 110). The quality gate tool 48 checks if the part of the software-hardware interface 18 to be changed by the request is a software-controlled part of the software-hardware interface 18. In response to the part of the software-hardware interface 18 to be changed by the request being a software-controlled part of the software-hardware interface 18, the quality gate tool 48 running on the processor 14 is configured to provide the message 36 responsively to the request to change the controlled given part 26-1 of the software-hardware interface 18 (block 112). In some embodiments, the message 36 includes a warning message warning that the request is attempting to change the controlled given part 26-1 of the software-hardware interface 18.

In some embodiments, the quality gate tool 48 running on the processor 14 is configured to: provide the message 36 indicating that the request to change the software-hardware interface 18 is denied (block 112); and deny the request to change the software-hardware interface 18 (block 114).

In some embodiments, the quality gate tool 48 running on the processor 14 is configured to provide an option to change the software-hardware interface 18 despite the warning message 36 (block 116). In some embodiments, the quality gate tool 48 running on the processor 14 is configured to request 38 from the hardware developer 30 of the interface update 34 a reason for the change to the controlled given part 26-1 of the software-hardware interface 18.

In some embodiments, the quality gate tool 48 running on the processor 14 is configured to: request permission 38 (and optionally include the reason in the request) from the software developer(s) 28 (of the software feature(s) controlling the controlled given part of the software-hardware interface 18) to change the controlled given part 26-1 of the software-hardware interface 18 (block 118); receive permission from the software developer(s) 28 to change the controlled given part 26-1 of the software-hardware interface 18 (block 120); and change the controlled given part 26-1 of the software-hardware interface 18 (block 122).

In some embodiments, the quality gate tool 48 running on the processor 14 is configured to provide the message 42 (e.g., override message) to the software developer(s) 28 of the software feature(s) that the controlled given part 26-1 of the software-hardware interface 18 has been, or will be, changed (block 124); and change the controlled given part 26-1 of the software-hardware interface 18 (block 122).

The quality gate tool 48 running on the processor 14 is configured to: receive a request from the hardware developer 30 to change a non-software-controlled part of the software-hardware interface 18 (block 126); and and change the non-software-controlled part of the software-hardware interface 18 (block 128).

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A software and hardware development method, comprising:
   providing a software-hardware interface to provide a data interface between hardware of an application specific integrated circuit (ASIC) and software running on a processor;
   providing control of a given part of the software-hardware interface to a software feature thereby yielding a more stable software-hardware interface wherein the providing control includes assigning a feature label of the software feature to the given part of the software-hardware interface;
   receiving a request to change the controlled given part of the software-hardware interface; and
   providing a message responsively to the request to change the controlled given part of the software-hardware interface.

2. The method according to claim 1, further comprising receiving user input selecting the feature label from a feature label database.

3. The method according to claim 1, further comprising adding the feature label to a feature label database.

4. The method according to claim 1, wherein the given part is a given control register in a control register space of the software-hardware interface.

5. The method according to claim 4, wherein the providing control includes assigning a feature label of the software feature to the given control register.

6. The method according to claim 1, further comprising changing a non-software-controlled part of the software-hardware interface.

7. The method according to claim 1, wherein the providing the message includes providing the message indicating that the request to change the software-hardware interface is denied.

8. The method according to claim 1, wherein the message includes a warning message warning that the request is attempting to change the controlled given part of the software-hardware interface.

9. The method according to claim 8, further comprising:
    providing an option to change the software-hardware interface despite the warning message; and
    changing the controlled given part of the software-hardware interface.

10. The method according to claim 9, further comprising providing a message to a software developer of the software feature that the controlled given part of the software-hardware interface has been, or will be, changed.

11. The method according to claim 1, further comprising requesting from a hardware developer a reason for the change to the controlled given part of the software-hardware interface.

12. The method according to claim 1, further comprising requesting permission from a software developer to change the controlled given part of the software-hardware interface.

13. A computer system, comprising:
    a processor to:
        provide a software-hardware interface to provide a data interface between hardware of an application specific integrated circuit (ASIC) and software running on a processor;
        provide control of a given part of the software-hardware interface to a software feature update thereby yielding a more stable software-hardware interface;
        assign a feature label of the software feature to the given part of the software-hardware interface;
        receiving a request to change the controlled given part of the software-hardware interface; and
        provide a message responsively to the request to change the controlled given part of the software-hardware interface; and
    a memory to store the software-hardware interface.

14. The system according to claim 13, wherein the processor is configured to receive user input selecting the feature label from a feature label database.

15. The system according to claim 13, wherein the processor is configured to add the feature label to a feature label database.

16. The system according to claim 13, wherein the given part is a given control register in a control register space of the software-hardware interface.

17. The system according to claim 16, wherein the processor is configured to assign a feature label of the software feature to the given control register.

18. The system according to claim 13, wherein the processor is configured to change a non-software-controlled part of the software-hardware interface.

19. The system according to claim 13, wherein the processor is configured to provide the message indicating that the request to change the software-hardware interface is denied.

20. The system according to claim 13, wherein the message includes a warning message warning that the request is attempting to change the controlled given part of the software-hardware interface.

21. The system according to claim 20, wherein the processor is configured to:
    provide an option to change the software-hardware interface despite the warning message; and
    change the controlled given part of the software-hardware interface.

22. The system according to claim 21, wherein the processor is configured to provide a message to a software developer of the software feature that the controlled given part of the software-hardware interface has been, or will be, changed.

23. The system according to claim 13, wherein the processor is configured to request from a hardware developer a reason for the change to the controlled given part of the software-hardware interface.

24. The system according to claim 13, wherein the processor is configured to request permission from a software developer to change the controlled given part of the software-hardware interface.

25. A software product, comprising a non-transient computer-readable medium in which program instructions are stored, which instructions, when read by a central processing unit (CPU), cause the CPU to:
    provide a software-hardware interface to provide a data interface between hardware of an application specific integrated circuit (ASIC) and software running on a processor;
    provide control of a given part of the software-hardware interface to a software feature thereby yielding a more stable software-hardware interface;
    assign a feature label of the software feature to the given part of the software-hardware interface;
    receive a request to change the controlled given part of the software-hardware interface; and
    provide a message responsively to the request to change the controlled given part of the software-hardware interface.

* * * * *